Patented June 8, 1948

2,442,781

UNITED STATES PATENT OFFICE 2,442,781

COMPOUNDING SYNTHETIC RUBBER WITH SULFUR CONTAINING MINERAL OIL EXTRACT

Fritz S. Rostler, Wilmington, Del., assignor to Wilmington Chemical Corporation, Wilmington, Del., a corporation of Delaware No Drawing. Application January 6, 1943, Serial No. 471,473

6 Claims. (Cl. 260—36)

The present invention relates to the manufacture of synthetic rubber goods and more particularly to the compounding and vulcanizing of synthetic rubbers of the butadiene copolymers.

The manufacture of vulcanizates from synthetic rubber of the present commercial types presents a number of recognized difficulties due to the peculiar characteristics of the synthetic materials. Taking the butadiene-acrylonitrile copolymers for illustrative purposes, it may be noted that epsecial difficulties are involved in the efforts to disperse sulfur homogeneously therein. Even the most careful compounding normally results in a very poor dispersion of sulfur within the synthetic material. Distribution of the sulfur is apparently resisted to such an extent that the properties of the cured products are seriously impaired. Thus soft rubber vulcanizates not only are inferior in uniformity to those resulting from the curing of natural rubber, but tend to vary widely in properties between vulcanizates of substantially the same composition. For example, cured soft rubber mixtures formed from synthetics of the butadiene-acrylonitrile type vulcanized with sulfur tend to show macroscopic variations wherein small particles of hard rubber can actually be detected. This is due to the localized agglomeration of sulfur.

It is accordingly an object achieved by the present invention to overcome the foregoing difficulties and provide for the compounding and vulcanization of synthetic rubbers and particularly those copolymers of butadiene, styrene and acrylonitrile by means of a plastic sulfur carrying agent which is homogeneously compatible with the synthetic, and mixes uniformly therewith so that the vulcanizing agent becomes readily distributed and permits the production of improved and uniform vulcanizates.

In accordance with the present invention it has been discovered that the foregoing objectives are achieved by compounding the synthetic material with a stabilized combination of sulfur in an organic plasticizer and extender which is compatible with the synthetic and capable of covulcanizing therewith to yield unimpaired vulcanizates. Yet more specifically it has been determined that sulfur may be combined with certain unsaturated hydrocarbon materials derived from the waste products of mineral oil refining having characteristics substantially identical with those of the products composed approximately of 90 per cent carbon and 10 per cent hydrogen, obtained by neutralizing petroleum acid sludge and fractionating the organic constituents thereof under vacuum to eliminate at least the portions boiling below 160° C. at 12 mm. Hg and preferably outside of the range from 160° to 360° C. at 12 mm. Hg. These hydrocarbons are thus obtained as purified distillates free of materials harmful to rubber. They combine with sulfur in substantial proportions to form effective sulfur distributing agents for use with synthetic rubber where sulfur dispersion is difficult. The sulfur carrying organic solvent, moreover, is not harmful in the resulting cured material but acts as a vulcanizable plasticizer and extender and at the same time improves the dispersion of carbon black in the mass.

The invention therefore contemplates in its broadest aspect the compounding of synthetic rubbers with homogeneous, fluent and plastic sulfur preparations wherein the sulfur is embodied within an organic solvent or carrier having material compatibility for both the synthetic rubber and the sulfur. The plastic sulfur carrier is of high boiling point incapable of creating porosity during the cure and is, moreover, covulcanizable with the rubber.

The preferred sulfur carrier utilized in accordance with the present invention is disclosed more specifically in the copending application of Rostler, Sternberg & du Pont, Serial No. 469,570, filed December 19, 1942, now Patent No. 2,399,694. As disclosed more in detail in the said copending application, stable homogeneous sulfur containing compositions may be prepared with up to 35 per cent sulfur content. As pointed out in the aforesaid copending application, the unsaturated hydrocarbon product preferably employed in the manufacture of these preparations has been extensively disclosed in various U. S. patents, including Nos. 2,185,951, 2,185,952 and 2,217,919. Its employment as a rubber compounding material has been proposed and it has been shown that it forms a valuable softener, plasticizer and extender and is capable of covulcanization in intimate admixture with rubber. This product, however, possesses only a relatively small dissolving capacity for sulfur at room temperature, the amount which may be taken up in stable solution being substantially less than that essential for meeting the foregoing problem. In accordance with the process described more in detail in the aforesaid copending application, the unsaturated hydrocarbon base is reacted with elemental sulfur under sufficiently drastic conditions to result in evolution of a large quantity of H₂S with the concurrent formation of products containing a high percentage of sulfur which remains in stable combination under atmospheric conditions. Broadly stated, these stable preparations are formed by reacting excess quantities of sulfur with the unsaturated and fractionated organic material at a temperature substantially above the melting point of sulfur and until at least approximately 5 to 7 per cent of the sulfur has been volatilized or lost from the reaction mass in the form of $H_2S$. The residual material, as the result of such treatment, contains high percentages of sulfur in a fixed sulfur form which does not separate or crystallize out under any atmospheric conditions of which we are aware.

The foregoing sulfur solutions or compounds containing sulfur for example in convenient proportions of from 6, 8, 10 or 15 per cent may be prepared in accordance with this process as described more in detail in the aforesaid application of Rostler, Sternberg & du Pont. Their viscosity at 100° C. is preferably above 100 cp. and usually in excess of four times the viscosity of the unsulfurized starting material. They readily compound with synthetic rubber compositions and function efficiently as sulfur supplying agents, under conditions favorable and sufficient for the vulcanization of the synthetic rubber. This is particularly remarkable in view of the fact that they are impractical for use with natural rubber due particularly to a tendency to retard vulcanization. Furthermore, since the dispersion of sulfur in natural rubber is easily accomplished, there is no advantage in using sulfur solutions according to the invention.

As will be apparent from the foregoing, the sulfur carrying organic materials employed in accordance with the preferred embodiment are restricted to those prepared from certain unsaturated hydrocarbon distillates derived from the refining of mineral oil; of the class consisting of components derived from the extract separated in the solvent refining of mineral oils and components separated by the distillation of acid sludge of petroleum oil refining. The removal therefrom by distillation, of fractions boiling substantially below 160° C. at 12 mm. Hg as well preferably as those boiling above 380° C. at 12 mm. Hg contributes to the success of the final product for the purposes intended. On the other hand, it must be particularly noted that the invention in its broad aspect is not so limited. Many other hydrocarbon materials and preferably bituminous products, are capable of being used with some success for the present purposes. Thus, for example, there are many relatively unsaturated petroleum products which may be treated in accordance with the principles of the present invention. Among these are petroleum oils resulting from cracking of those containing a naturally high content of unsaturates. Such products may include asphaltic petroleum products as well as bituminous products such as coal tar and related asphalts and the natural asphalts. As is apparent from the foregoing, the invention thus contemplates the utilization of undistilled products such as extracts from the refining with selective solvents as well as neutralized acid sludges of suitable viscosity and boiling point. Pine tar similarly has some utility in accordance with the present invention. In general these materials are suitable for treatment in accordance with the principles hereinabove enunciated provided that they possess a boiling point substantially above 160° C. at 12 mm. Hg and contain a substantial proportion of unsaturated material. More specifically the boiling point should be considerably in excess of 160° C. and preferably above 180° or 190° C. at 12 mm. Hg. The requisite degree of unsaturation is indicated conveniently by solubility in sulfuric acid both concentrated and fuming. Hydrocarbon tars and asphalts of the required boiling point and soluble at least to the extent of 40 per cent in fuming sulfuric acid all seem to possess utility for the present purposes. It will be appreciated, however, in view of the principles stated above that a larger proportion of unsaturates is to be preferred, the foregoing representing an approximate minimum of the operative range of utility. Higher concentrations of unsaturated material are increasingly advantageous as are also higher boiling materials in so far as the final material can be incorporated in higher proportions to give an advantageous degree of fluidity for facilitating incorporation of other ingredients, such as powdered fillers, especially carbon black, into the rubber mix.

Such materials in general form stable, high sulfur organic preparations compatible with synthetic rubber in sufficient proportions to satisfy the optimum sulfur requirements for vulcanization. It is important to point out, however, that the hydrocarbon base used in the production of these sulfur preparations should not be composed of too highly unsaturated products since these impart bad aging properties and brittleness to the final vulcanizate. In other words the compositions employed should preferably be selected from materials having a relatively restricted degree of unsaturation.

Compositions having an iodine number between 20 and 60, and preferably between 40 and 60, have been found most suitable for the preparation of sulfur carriers of the present type.

Mixing of the rubber compound may be carried out with the usual equipment employed in commercial compounding. Thus the compound may be prepared on a mill or internal mixer, together with the usual additions of zinc oxide, accelerator, antioxidant, stearic acid, carbon black, and the like. The proportion of vulcanizing agent added should be selected so that sufficient sulfur is present in order to complete the desired vulcanization of the synthetic rubber present in the mix, as well as satisfy the vulcanizing capacity of the unsaturated distillate present. In general it may be stated that approximately 3-6 per cent sulfur on the weight of the unsaturated hydrocarbon distillate is necessary in order to assure compliance with the sulfur requirement of this ingredient in the preparation of soft rubber compounds. Obviously then the sulfur carrying agent must provide sufficient additional sulfur to satisfy the demands of the synthetic rubber. The requirement of sulfur for the various forms of synthetic materials normally is a known factor, depending upon the degree of vulcanization required in the compounding. In the case of the butadiene-acrylonitrile copolymer, the reccommended sulfur concentration is 1½ to 2 per cent. While the recommended concentration may be expected to vary materially, depending upon the synthetic employed and the desired quality of the finished product, nevertheless the foregoing principles afford a simple procedure for calculating the total requirement or sulfur in any selected mix.

In view of the somewhat higher sulfur requirement of the present additive during vulcanization, it is further evident that the total quantity necessary may vary appreciably, depending upon the quantity of the organic hydrocarbon sulfur carrier present. Bearing in mind, however, that this ingredient is added in widely varying proportions for the purpose of securing those advantages resulting from its presence, it will be seen that in any case the sulfur requirement is readily determinable. Thus, for example, where as high as 50 parts of the sulfur carrier are employed per hundred parts of the foregoing illustrative butadiene acrylonitrile copolymer, the optimum amount of sulfur is approximately 3.5 parts. It is convenient to use a stabilized sulfur preparation standardized to 10 per cent of fixed sulfur. This may be diluted as desired with some portion of a second preparation containing 6 per cent fixed sulfur. Where smaller additions of the sulfur carrier are required it will, of course, be necessary to use sulfur carriers containing much higher percentages of fixed sulfur. Thus for example, where the hydrocarbon addition is restricted to 20 parts on 100 parts of butadiene acrylonitrile copolymer, a stabilized preparation containing 15 per cent fixed sulfur is advantageously employed.

The amount of sulfur carrying organic material which may be tolerated in a synthetic rubber compound is surprisingly high. As indicated above, up to 50 parts per 100 parts of the synthetic does not impair the final product and greater additions are permissible for many purposes. On the other hand, from about 20 to 30 parts of the sulfur solution per 100 parts of synthetic improves the physical properties of some synthetic rubber compositions considerably. Thus for most purposes it is evident that proceeding under optimum conditions a sulfur solution containing at least about 10 per cent sulfur may be employed. Of course variation from this optimum condition may be permitted within rather wide limits, depending upon the desired extent of final vulcanization and the proportion of the organic solvent which is permissible in the mix.

The following are a few specific examples, servicing to more particularly exemplify:

*Example I*

| | Parts by weight |
|---|---|
| Commercial butadiene-acrylonitrile copolymer | 100 |
| Stearic acid | 0.5 |
| A stabilized sulfur preparation containing 10% fixed sulfur and formed from the distilled neutralized acid tar resulting from the refining of mineral oil and having a boiling point within the range of 250° to 280° C. at 12 mm. Hg in accordance with the foregoing copending application of Rostler, Sternberg & du Pont | 25 |
| Mercapto benzo thiazole accelerator | 1.25 |
| Diphenyl guanidine accelerator | 0.25 |
| Channel black | 50 |
| Zinc oxide | 5 |

The mixture compounded readily and was given an optimum cure at 45 pounds steam pressure for 30 minutes to produce a soft rubber product. The product had the following properties:

| | |
|---|---|
| Specific gravity | 1.196 |
| Tensile (at break lbs./sq. in.) | 4200 |
| Elongation (at break percent) | 680 |
| Hardness (Shore) | 71 |
| Abrasion (Du Pont index) | 8 |

It is particularly important to note that the foregoing properties were materially improved over similar products employing elemental sulfur as a vulcanizing agent and compounded in conventional manner. Of even greater significance is the fact that the foregoing results were readily duplicated within the limits of experimental error and the properties were substantially the same for any number of specimens cut from the same slab. The excellent abrasion resistance of the synthetic employed is not impaired by the present addition, nor is its resistance to gasoline and oils affected.

Somewhat analogous results are obtained when compounding any of the other various butadiene polymers, as for example the butadiene-styrene product. The well known polymers of chloroprene are likewise adapted for compounding in accordance with the present invention.

Even more highly concentrated sulfur carriers may be advantageously employed as indicated by the use of such products containing 15 per cent sulfur in substitution for the corresponding ingredient of the foregoing example.

*Example II*

| | Parts by weight |
|---|---|
| Commercial butadiene acrylonitrile copolymer | 100 |
| Stearic acid | 0.5 |
| The stabilized sulfur preparation as defined in Example I | 28 |
| Mercapto benzo thiazole accelerator | 1.25 |
| Diphenyl guanidine accelerator | 0.25 |
| Channel black | 55 |
| Zinc oxide | 5 |

The above ingredients were compounded identically as in Example I and resulted in a product having quite similar properties.

The invention is not limited to the synthetic rubbers mentioned but is equally applicable to all kinds of vulcanizable synthetic rubber and compounds thereof in which the dispersion of sulfur in the dry state is difficult.

What I claim is:

1. In the manufacture of vulcanizates from relatively tough synthetic rubbery sulfur vulcanizable materials of the class consisting of copolymers of butadiene and acrylonitrile and copolymers of butadiene and styrene, which resist the dispersion of elemental sulfur, the step which comprises mixing the said synthetic material with the reaction product of an unsaturated hydrocarbon mass having approximately 90% of carbon and 10% of hydrogen, and substantially free of fractions having a boiling point of less than about 160° C. at 12 mm. Hg of the class consisting of components derived from the extract separated in the solvent refining of mineral oils and components separated by the distillation of neutralized acid sludge of petroleum oil refining, and an amount of sulfur equal to at least 5% in excess of the sulfur contained in the final reaction product, said reaction being carried out for a time not less than that necessary to volatilize at least 5% of the sulfur based on the weight of the reaction product, said reaction product being stable as to separation and crystallization of sulfur at atmospheric temperatures and containing from 10% to 15% fixed sulfur, the amount of said reaction product being from 20% to 30% of the weight of said synthetic material.

2. In the manufacture of vulcanizates from relatively tough synthetic rubbery sulfur vulcanizable co-polymers of butadiene and styrene, which resist the dispersion of elemental sulfur, the step which comprises mixing the said synthetic material with the reaction product of an unsaturated hydrocarbon mass having approximately 90% of carbon and 10% of hydrogen, and substantially free of fractions having a boiling point of less than about 160° C. at 12 mm. Hg of the class consisting of components derived from the extract separated in the solvent refining of mineral oils and components separated by the distillation of neutralized acid sludge of petroleum oil refining, and an amount of sulfur equal to at least 5% in excess of the sulfur contained in the final reaction product, said reaction being carried out for a time not less than that necessary to volatilize at least 5% of the sulfur based on the weight of the reaction product, said reaction product being stable as to separation and crystallization of sulfur at atmospheric temperatures and containing from 10% to 15% fixed sulfur, the amount of said reaction product being from 20% to 30% of the weight of said synthetic material.

3. In the manufacture of vulcanizates from relatively tough synthetic rubbery sulfur vulcanizable co-polymers of butadiene and acrylonitrile, which resist the dispersion of elemental sulfur, the step which comprises mixing the said synthetic material with the reaction product of an unsaturated hydrocarbon mass having approximately 90% of carbon and 10% of hydrogen, and substantially free of fractions having a boiling point of less than about 160° C. at 12 mm. Hg of the class consisting of components derived from the extract separated in the solvent refining of mineral oils and components separated by the distillation of neutralized acid sludge of petroleum oil refining, and an amount of sulfur equal to at least 5% in excess of the sulfur contained in the final reaction product, said reaction being carried out for a time not less than that necessary to volatilize at least 5% of the sulfur based on the weight of the reaction product, said reaction product being stable as to separation and crystallization of sulfur at atmospheric temperatures and containing from 10% to 15% fixed sulfur, the amount of said reaction product being from 20% to 30% of the weight of said synthetic material.

4. In the manufacture of vulcanizates from relatively tough synthetic rubbery sulfur vulcanizable materials of the class consisting of co-polymers of butadiene and acrylonitrile and co-polymers of butadiene and styrene, which resist the dispersion of elemental sulfur and of carbon black, the step which comprises mixing the said synthetic material with carbon black and the reaction product of an unsaturated hydrocarbon mass having approximately 90% of carbon and 10% of hydrogen, and substantially free of fractions having a boiling point of less than about 160° C. at 12 mm. Hg of the class consisting of components derived from the extract separated in the solvent refining of mineral oils and components separated by the distillation of neutralized acid sludge of petroleum oil refining, and an amount of sulfur equal to at least 5% in excess of the sulfur contained in the final reaction product, said reaction being carried out for a time not less than that necessary to volatilize at least 5% of the sulfur based on the weight of the reaction product, said reaction product being stable as to separation and crystallization of sulfur at atmospheric temperatures and containing from 10% to 15% fixed sulfur, the amount of said reaction product being from 20% to 30% of the weight of said synthetic material, said reaction product improving the dispersion of said carbon black in said synthetic material.

5. In the manufacture of vulcanizates from relatively tough synthetic rubbery sulfur vulcanizable co-polymers of butadiene and styrene, which resist the dispersion of elemental sulfur and of carbon black, the step which comprises mixing the said synthetic material with carbon black and the reaction product of an unsaturated hydrocarbon mass having approximately 90% of carbon and 10% of hydrogen, and substantially free of fractions having a boiling point of less than about 160° C. at 12 mm. Hg of the class consisting of components derived from the extract separated in the solvent refining of mineral oils and components separated by the distillation of neutralized acid sludge of petroleum oil refining, and an amount of sulfur equal to at least 5% in excess of the sulfur contained in the final reaction product, said reaction being carried out for a time not less than that necessary to volatilize at least 5% of the sulfur based on the weight of the reaction product, said reaction product being stable as to separation and crystallization of sulfur at atmospheric temperatures and containing from 10% to 15% fixed sulfur, the amount of said reaction product being from 20% to 30% of the weight of said synthetic material, said reaction product improving the dispersion of said carbon black in said synthetic material.

6. In the manufacture of vulcanizates from relatively tough synthetic rubbery sulfur vulcanizable co-polymers of butadiene and acrylonitrile, which resist the dispersion of elemental sulfur and of carbon black, the step which comprises mixing the said synthetic material with carbon black and the reaction product of an unsaturated hydrocarbon mass having approximately 90% of carbon and 10% of hydrogen, and substantially free of fractions having a boiling point of less than about 160° C. at 12 mm. Hg of the class consisting of components derived from the extract separated in the solvent refining of mineral oils and components separated by the distillation of neutralized acid sludge of petroleum oil refining, and an amount of sulfur equal to at least 5% in excess of the sulfur contained in the final reaction product, said reaction being carried out for a time not less than that necessary to volatilize at least 5% of the sulfur based on the weight of the reaction product, said reaction product being stable as to separation and crystallization of sulfur at atmospheric temperatures and containing from 10% to 15% fixed sulfur, the amount of said reaction product being from 20% to 30% of the weight of said synthetic material and carbon black, said reaction product improving the dispersion of said carbon black in said synthetic material.

FRITZ S. ROSTLER.

REFERENCES CITED

The following references are of record in the file of this patent:

UNITED STATES PATENTS

| Number | Name | Date |
|---|---|---|
| 657,240 | Hornung | Sept. 4, 1900 |
| 1,446,039 | Gardner | Feb. 20, 1923 |

(Other references on following page)

UNITED STATES PATENTS

| Number | Name | Date |
|---|---|---|
| 1,535,740 | Shelling | Aug. 28, 1925 |
| 1,884,240 | Rhodes | Oct. 25, 1932 |
| 2,040,698 | Lewis et al. | May 12, 1936 |
| 2,082,304 | Stam | June 1, 1937 |
| 2,128,654 | Lebedenko et al. | Aug. 30, 1938 |
| 2,180,367 | Rostler | Nov. 21, 1939 |
| 2,217,918 | Rostler | Oct. 15, 1940 |
| 2,316,964 | McKinney | Apr. 20, 1943 |
| 2,332,194 | Beekley | Oct. 19, 1943 |
| 2,399,694 | Rostler et al. | May 7, 1946 |

FOREIGN PATENTS

| Number | Country | Date |
|---|---|---|
| 255,546 | Great Britain | July 26, 1926 |
| 540,049 | Great Britain | Oct. 3, 1941 |

OTHER REFERENCES

Meyer, Natural-Synthetic High Polymers (Interscience, 1942), pp. 146 to 148.

Carothers, Industrial and Engineering Chem., vol. 26, No. 1, Jan. 1939.

Dinsmore, Chemical and Engineering News, vol. 21, No. 21, Nov. 10, 1943, pp. 1798–1801.